US006554570B2

(12) United States Patent
Dailey

(10) Patent No.: US 6,554,570 B2
(45) Date of Patent: Apr. 29, 2003

(54) TURBINE BLADE SUPPORT ASSEMBLY AND A TURBINE ASSEMBLY

(75) Inventor: Geoffrey M Dailey, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/923,338

(22) Filed: Aug. 8, 2001

(65) Prior Publication Data

US 2002/0018715 A1 Feb. 14, 2002

(51) Int. Cl.[7] ..................... B64C 11/00

(52) U.S. Cl. ..................... 416/1; 415/115; 415/116; 416/96 R

(58) Field of Search ..................... 415/1, 115, 116, 415/117, 175, 176, 177, 178, 179; 416/1, 95, 96 R

(56) References Cited

U.S. PATENT DOCUMENTS

| | | | | |
|---|---|---|---|---|
| 2,858,102 A | * 10/1958 | Bloomberg | 416/193 A |
| 3,781,129 A | * 12/1973 | Aspinwall | 415/115 |
| 3,804,551 A | * 4/1974 | Moore | 416/97 R |
| 3,814,539 A | * 6/1974 | Klompas | 415/115 |
| 4,086,757 A | * 5/1978 | Karstensen et al. | 415/115 |
| 4,179,240 A | 12/1979 | Kothmann | |
| 4,190,398 A | * 2/1980 | Corsmeier et al. | 415/114 |
| 4,217,755 A | * 8/1980 | Williams | 415/115 |
| 4,244,676 A | 1/1981 | Grondahl | |
| 4,330,235 A | 5/1982 | Araki | |
| 4,350,473 A | * 9/1982 | Dakin | 415/116 |
| 4,456,428 A | 6/1984 | Cuvillier | |
| 6,094,905 A | * 8/2000 | Fukuyama | 415/115 |
| 6,224,327 B1 | * 5/2001 | Aoki et al. | 415/114 |

FOREIGN PATENT DOCUMENTS

| | | |
|---|---|---|
| GB | 1176592 P | 1/1970 |
| GB | 2041100 A | 9/1980 |
| GB | 2252368 A | 8/1992 |

* cited by examiner

*Primary Examiner*—Edward K. Look
*Assistant Examiner*—Dwayne J. White
(74) *Attorney, Agent, or Firm*—W. Warren Taltavull; Manelli, Denison & Selter PLLC

(57) ABSTRACT

A turbine assembly (35) for a gas turbine engine (10) comprises a rotatable support arrangement (38) which comprises means for mounting thereon a plurality of turbine blades (36). The turbine assembly (35) defines flow path means (43) for a flow of cooling fluid therethrough. The flow path means (43) is connectable to a supply of relatively cold cooling fluid. The flow path means 43 is arranged such that the relatively cold cooling fluid is driven radially outwardly through the flow path means (43) substantially wholly by the centrifugal force generated the rotation of the turbine assembly (35) in operation. Relatively hot cooling fluid is displaced by the relatively cold cooling fluid radially inwardly through the flow path means (43).

14 Claims, 4 Drawing Sheets

TURBINE BLADE SUPPORT ASSEMBLY AND A TURBINE ASSEMBLY

FIELD OF THE INVENTION

This invention relates to turbine blade cooling systems. More particularly, but not exclusively the invention relates to turbine blade cooling systems and turbine assemblies for gas turbine engines.

BACKGROUND OF THE INVENTION

It is sometimes necessary to provide the intermediate pressure turbine of a gas turbine engine with a moderate cooling. Known techniques for cooling turbine blades in gas turbine engines use air from a pre-swirl system. However such systems for cooling are costly and inefficient and there are significant energy losses associated with such systems.

SUMMARY OF THE INVENTION

According to one aspect of this invention there is provided a turbine assembly comprising a rotatable support arrangement, a plurality of turbine blades extending radially outwardly from the support arrangement, and flow path means extending radially in each of the blades for a flow of cooling fluid therethrough, and the flow path means being connectable to a supply of relatively cold cooling fluid, wherein the flow path means is arranged such that the relatively cold cooling fluid is driven radially outwardly through the flow path means substantially wholly by the centrifugal force generated by rotation of the assembly in operation, to drive relatively hot cooling fluid radially inwardly through the flow path means.

Preferably, the flow path means comprises a first flow path through which said relatively cold cooling fluid can pass and a second flow path through which said relatively hot cooling fluid can pass.

According to another aspect of this invention there is provided a method of cooling a turbine assembly, the assembly comprising a rotatable support arrangement and a plurality of turbine blades extending radially outwardly from the support arrangement, and flow path means extending radially in each of the blades for a flow of cooling fluid therethrough, wherein the method comprises arranging the flow path means in fluid communication with a supply of relatively cold cooling fluid and rotating the support arrangement to drive the relatively cold cooling fluid radially outwardly through the flow path means substantially wholly by the centrifugal force generated by rotation of the assembly in operation, and allowing said cooling fluid to be heated in said blades, whereby relatively hot cooling fluid is displaced radially inwardly through the cooling path means by the flow of said relatively cold cooling fluid.

The support arrangement may define a second flow path means in fluid communication with the first mentioned flow path means. The second flow path means may comprise a feed flow path extending from an inlet to the first flow path and an exhaust flow path from the second flow path to an outlet. The inlet and outlet may be provided in substantially the same region.

The preferred embodiment of the turbine assembly is an intermediate pressure turbine assembly. In the preferred embodiment, fluid flowing along the feed flow path can pass into the first flow path in each blade to extract heat therefrom and thereafter can flow into the second flow path to pass into the exhaust flow path to be exhausted via the outlet.

Preferably, the inlet of the cooling path means is defined at a central region of the support arrangement. The outlet of the cooling path means may also be defined at the central region of the support arrangement. In one embodiment, substantially all the cooling fluid entering the first mentioned flow path means is delivered to the second flow path means. Substantially all the cooling fluid entering the feed flow path may be delivered to the first mentioned flow path means, and substantially all the cooling fluid entering the exhaust flow path may be exhausted from the outlet.

The support arrangement may comprise a support disc upon which said plurality of turbine blades can be mounted and said support arrangement may further include a cover member arranged over a face of the disc. The cover member may be adapted to hold the turbine blades on the disc.

In one embodiment, at least a part of the flow path means may extend generally radially along the support disc. A further part of the flow path means may extend generally circumferentially of the disc. In one embodiment, part of the feed flow path extends generally radially of the disc and part of the exhaust flow path extends generally radially of the disc. A further part of the feed flow path may extend generally circumferentially of the disc, and a further part of the exhaust flow path may also extend generally circumferentially of the disc.

The flow path means may be defined by the cover member. Preferably, the flow path means is defined between the cover member and the disc. In one embodiment, the feed and exhaust flow paths are provided generally in a plane, said plane being generally parallel to the plane of the disc. In another embodiment, the feed and exhaust flow paths are provided in a plane generally transverse to the plane of the disc.

Each turbine blade may have a securing portion to secure the blade to the disc, and an opening may be defined in the securing portion through which cooling fluid can enter the first flow path in the blade. Each blade may further include a shank and an aerofoil section, the shank extending between the securing portion and the aerofoil section. A shroud member may be provided between the shank and the aerofoil section, whereby, when assembled, the shroud members of adjacent turbine blades engage each other to define a space between the shroud and the disc. In one embodiment, an opening for the second flow path in the blade may be defined in the shank, whereby cooling fluid in the second flow path in each blade can be passed from the blade into the space.

The exhaust path in the support arrangement may be in fluid communication with the space, whereby cooling fluid may flow from said second path means in the blade to the exhaust path means via said space.

BRIEF DESCRIPTION OF THE DRAWINGS

An embodiment of the invention will now be described by way of example only with reference to the accompanying drawings, in which.

DETAILED DESCRIPTION OF THE INVENTION

Figure 1:
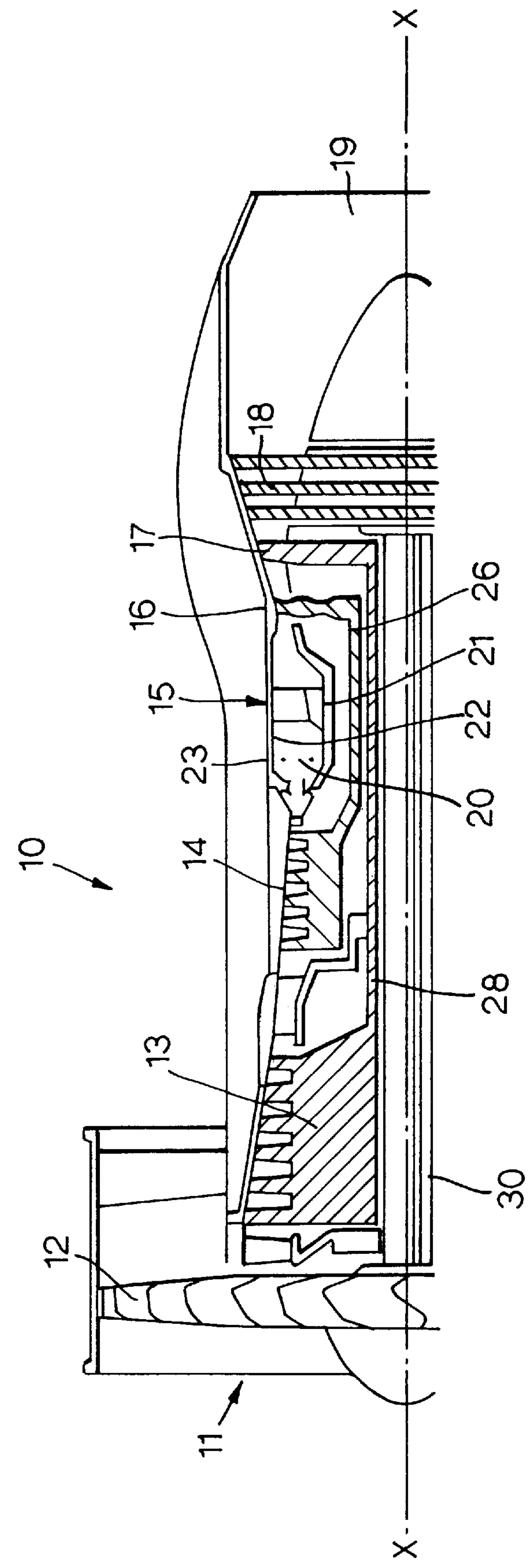
FIG. 1 is a sectional side view of the upper half of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

Figure 2:
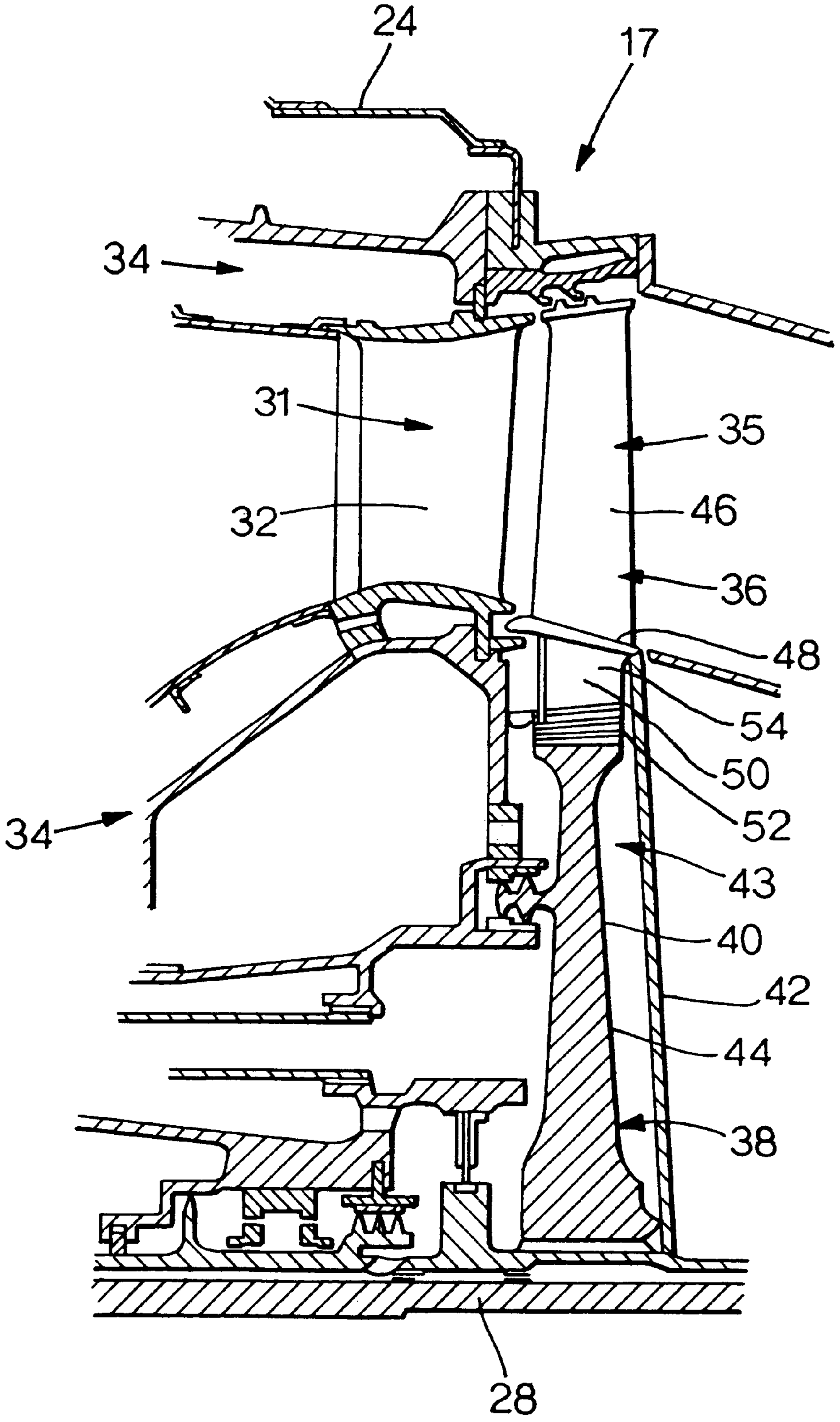
FIG. 2 is a sectional side view of part of a high pressure turbine incorporated in the engine shown in FIG.

Referring to FIG. 2, there is shown a section through part of the intermediate pressure turbine 17 which is a single stage turbine and is connected to, and drives, the intermediate pressure compressor 13 via a shaft 28. A casing 24 extends around the intermediate pressure turbine 17 and also extends around the high and low pressure turbines 16 and 18.

The intermediate pressure turbine 17 comprises a stator assembly 31 comprising an annular array of fixed guide vanes 32 arranged upstream of a rotary assembly 35. The guide vanes 32 are supported between an outer support structure 34 which extends circumferentially around the outer ends of the array of guide vanes 32 and an inner support structure 134 located radially inwardly of the guide vanes 32. The rotary assembly comprises an annular array of turbine blades 36 mounted on a rotatable support arrangement 38 which in turn is mounted on the shaft 28. The rotatable support arrangement 38 comprises a turbine disc 40 and a cover plate 42 mounted over the dished rear face 44 of the disc 40 to define cooling flow path means 43 (as will be explained below). The blades 36 each comprise an aerofoil section 46, a shroud member 48 provided at the radially inner end of each aerofoil section 46, a shank 50 extending radially inwardly of the shroud member and a securing portion 52 in the form of a fir tree root provided at the radially inner end of the shank 50.

When all of the blades 36 have been assembled around the disc 40, the shroud members 48 of adjacent blades 36 engage each other to define spaces 54 between the shroud members 48, the disc 40 and between the shanks 50 of adjacent blades 36. A plurality of such spaces 54 are provided, extending in an annular manner around the disc 40.

The high and low pressure turbines 16 and 18 also comprise arrangements of guide vanes and rotor blades. The high pressure turbine 16 receives combustion products from the combustor 15 and is connected to and drives the high pressure compressor 14 via a shaft 26 (see FIG. 1). Similarly, the low pressure turbine 18 receives combustion products from the intermediate pressure turbine 17 and is connected to, and drives, the fan 12 via a shaft 30 (see FIG. 1).

Figure 3:
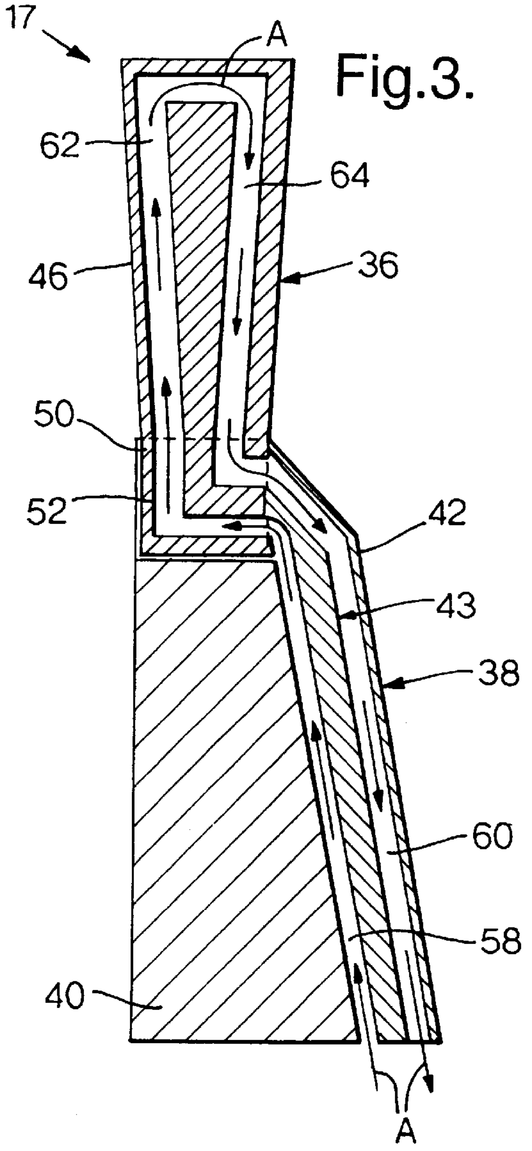
FIG. 3 is a schematic cross-sectional side view of part of one embodiment of the turbine assembly shown in FIG. 2.

FIG. 3 shows a schematic part sectional side view of the intermediate pressure turbine 17; the same features as in FIG. 2 have been given the same reference numerals. The cooling flow path means 43 is defined in the rotatable support arrangement 38, and comprises a feed channel 58 defined between the cover plate 42 and the disc 40, and an exhaust channel 60 defined within the cover plate 42.

The feed channel 58 extends radially outwardly of the support arrangement 38 to the blade 36. A first channel 62 is defined inside the blade 36 which is in fluid communication with the feed channel 58. A second channel 64 extends from, and is in fluid communication with the first channel 62. The second channel 64 is also defined inside the blade 36 and is in fluid communication with the exhaust channel 60. As can be seen from FIG. 3, a flow of cooling fluid, as indicated by the arrows A passes along the feed channel 58 to the first channel 62 and thereafter to the exhaust channel 60 via the second channel 64. As the cooling fluid flows in the direction indicated by the arrows A, heat is extracted from the disc 40 and from the blades 36. As shown, substantially all the air entering the first channel 62, the second channel 64 and the exhaust channel 60 is exhausted therefrom. A small amount of air may be bled off from the first or second channel 62, 64 if desired.

During the operation of the intermediate pressure turbine 17, the blades 36 are heated, which in turn heats the air in the first and second channels 62, 64 thereby causing the air to expand. The air in the channels 62, 64 is displaced by incoming cooler air of higher density driven along the feed channel 58 by centrifugal force created by the rotation of the intermediate pressure turbine 17. The hot air in the channels 62, 64 displaced along the exhaust channel 60.

As a result, a continuous cycle of cooling air is established through the channels 58, 62, 64, 60 to effect cooling of the blade 36.

A pressure difference is established across the first and second channels 62, 64 which drives the air through the channels. Since the pressures at the channels 62, 64 are greater than the pressure at the inlet of the feed channel 58 and at the exhaust channel 60, the exhaust channel 60 can exhaust to a region of the same pressure as the inlet for the feed channel 58.

Figure 4:
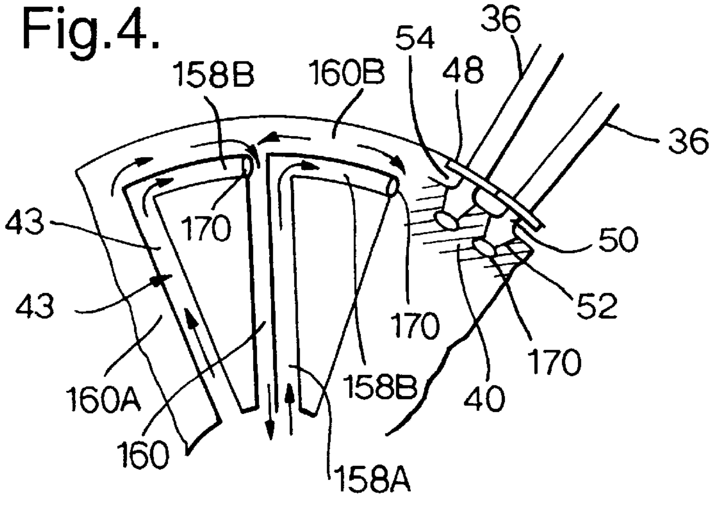
FIG. 4 is a schematic rear view of another embodiment of a turbine assembly.
Figure 5:
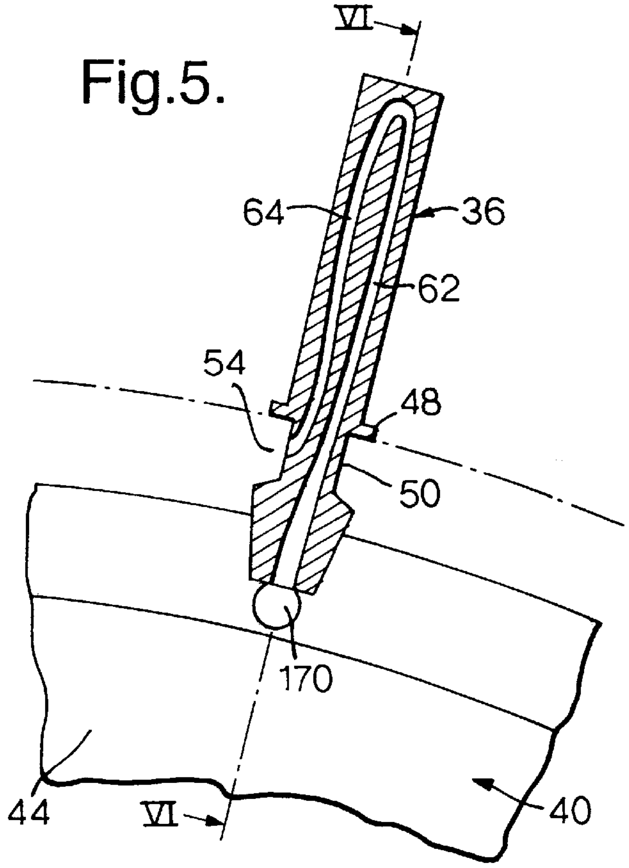
FIG. 5 is a close up sectional view of the turbine assembly shown in FIG. 4.
Figure 6:
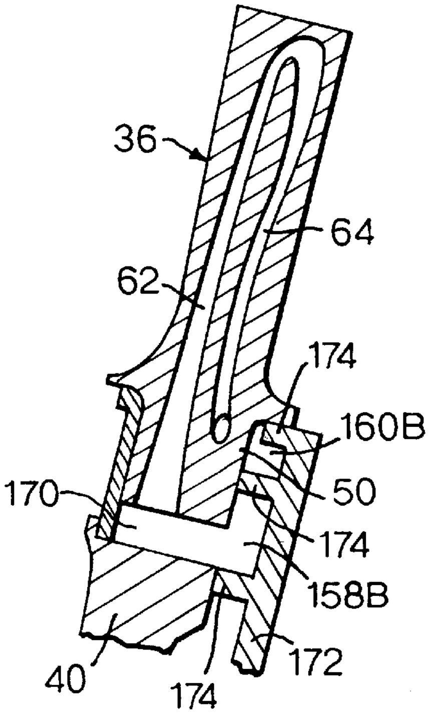
FIG. 6 is a view along the lines VI—VI in FIG. 5.

A further embodiment is shown in FIGS. 4, 5 and 6 in which the feed and exhaust channels are arranged such that they extend generally parallel to the rear face 44 of the disc 40, and are generally in the same plane. In FIGS. 4, 5 and 6 in which no more than two of the blades are shown for clarity, the feed channels are designated 158A and 158B, and the exhaust channels are designated 160A, 160B. Each feed channel comprises a radial part 158A, and a circumferentially extending part 158B. The air flows radially outwardly along the channel 158A, into the channel 158B and thereafter through a plurality of openings 170 each of which communicates with the first channel in the associated blade 36. On return from each blade 36, the hot air passes from the second channel 64 therein into the spaces 54 between the shanks 50 of the blades 36 and into the exhaust channel 160B and thereafter into one of the radially extending channels 160A. As can be seen from FIG. 6 the channels 158A, 158B, 160A, 160B are defined between a cover plate 172 for the disc 40, and the disc 40 itself, by appropriate shaped formations 174 extending from the cover plate 172, the formations 174 being adapted to engage the blade 36 or the disc 40.

It is desirable to ensure that the cooling air flows inwardly through the feed channels 58, 158 and outwardly via the exhaust channels 60, 160, rather than in the opposite direction. To effect this, the feed channels 60, 160 are provided with biassing means to direct the flow of cooling air in the desired direction. An example of such a biassing means is to angle the inlet slots or to make the cooling inlet slightly narrower than the exhaust.

There is thus described, a system for cooling the disc 40 of a turbine assembly, and also for cooling the blades 36 mounted on the disc 40, which relies on a thermosiphon effect to drive the cooling air through the cooling passages. Advantages of the above described embodiments are that the air passing out of the second channels 62 in the blades 36 is used to provide annular sealing, which means that no additional air is required for cooling. Similarly, since the air is driven by a thermosiphon effect created by the rotation of the turbine blades, there is no net pumping power required. An additional advantage is that the flow of air tends to increase as the temperature of the blades increases which means that there is a degree of self modulation.

Various modifications can be made without departing from the scope of the invention. For example, the channels could be arranged in a different configuration to that shown in FIGS. 3 and 4.

The preferred embodiment of the invention has the advantage that air used for cooling is destined for annulus sealing. As a consequence, no additional cooling air is required. A further advantage of the preferred embodiment is that cooling air flow increases with blade temperature which allows a degree of self-modulation of the cooling. In addition, no net work is done in the preferred embodiment so that no net pumping power is required, and the air can be returned to its supply pressure, if desired.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A turbine assembly comprising a rotatable support arrangement, a plurality of turbine blades extending radially outwardly from the support arrangement, and flow path means extending radially in each of the blades for a flow of cooling fluid therethrough, and the flow path means being connectable to a supply of relatively cold cooling fluid, wherein the flow path means is arranged such that the relatively cold cooling fluid is driven radially outwardly through the flow path means substantially wholly by the centrifugal force generated by rotation of the turbine assembly in operation, to displace relatively hot cooling fluid radially inwardly through the flow path means, the support arrangement defining a second flow path means in fluid communication with the first mentioned flow path means to connect the first mentioned flow path means to the source of cooling fluid, said second flow path means comprising a feed flow path extending from an inlet to the first flow path and an exhaust flow path extending from the second flow path to an outlet, said inlet and outlet being located at substantially the inner most region of the support arrangement.

2. An assembly according to claim 1 wherein substantially all the cooling fluid entering the first mentioned flow path means is delivered to the second flow path means, substantially all the cooling fluid entering the feed flow path is delivered to the first mentioned flow path means, and substantially all the cooling fluid entering the exhaust flow path is exhausted from the outlet.

3. A method of cooling a turbine assembly, the turbine assembly being as claimed in claim 1, wherein the method comprises arranging the flow path means in fluid communication with a supply of relatively cold cooling fluid, and rotating the support arrangement to drive the relatively cold cooling fluid radially outwardly through the flow path means substantially wholly by the centrifugal force generated by rotation of the assembly in operation, and allow said cooling fluid to be heated in said blade whereby the relatively hot cooling fluid is displaced radially inwardly through the cooling path means by the flow of said relatively cold cooling fluid.

4. An assembly according to claim 1 wherein said support arrangement has a central region and the inlet and the outlet of the cooling path means are defined at the central region of the support arrangement.

5. An assembly according to claim 4 wherein the support arrangement includes a support disc upon which said plurality of turbine blades can be mounted, and a cover member arranged over a face of the disc, at least a part of the second flow path means extending generally radially along the support disc.

6. An assembly according to claim 5 wherein part of the feed flow path extends generally radially of the disc and part of the exhaust flow path extends generally radially of the disc.

7. An assembly according to claim 5 wherein a further part of the flow path means extends generally circumferentially of the disc.

8. An assembly according to claim 7 wherein a further part of the feed flow path and of the exhaust flow path extend generally circumferentially of the disc.

9. An assembly according to claim 8 wherein the flow path means is defined by the cover member.

10. An assembly according to claim 9 wherein the flow path means is defined between the cover member and the disc.

11. An assembly according to claim 9 wherein the feed and exhaust flow paths are provided generally in a plane, said plane being generally parallel to the plane of the disc.

12. An assembly according to claim 9 wherein the feed and exhaust flow paths are provided in a plane generally transverse to the plane of the disc.

13. An assembly according to claim 5 wherein each turbine blade has a securing portion to secure the blade to the disc, and an opening is defined in the securing portion through which cooling fluid can enter the first flow path in the blade, and each blade further includes a shank and an aerofoil section, the shank extending between the securing portion and aerofoil section, a shroud member being provided between the shank and the aerofoil section, whereby, when assembled, the shroud members of adjacent turbine blades engage each to define a space between the shroud and the disc and an opening for the second flow path in the blade is defined in the shank, whereby cooling fluid is the second flow path in each blade can be passed from the blade into the space.

14. An assembly according to claim 13 wherein the exhaust path in the support assembly is in fluid communication with the space, whereby cooling fluid flows from said second path means in the blade to the exhaust path means via said space.

* * * * *